United States Patent
Griffin et al.

(10) Patent No.: US 7,163,117 B2
(45) Date of Patent: Jan. 16, 2007

(54) STATIC CHARGE DISSIPATER FOR FILLER NECK CLOSURE

(75) Inventors: Jeffery Griffin, Connersville, IN (US); Gary L. Dunkle, Connersville, IN (US); Wallace D. Tallent, Greenfield, IN (US)

(73) Assignee: Stant Manufacturing Inc., Connersville, IN (US)

( * ) Notice: Subject to any disclaimer, the term of this patent is extended or adjusted under 35 U.S.C. 154(b) by 238 days.

(21) Appl. No.: 10/427,388

(22) Filed: Apr. 30, 2003

(65) Prior Publication Data

US 2004/0000554 A1    Jan. 1, 2004

Related U.S. Application Data

(60) Provisional application No. 60/376,770, filed on May 1, 2002.

(51) Int. Cl.
*B65D 51/16*    (2006.01)

(52) U.S. Cl. .............................. 220/303; 220/DIG. 33; 220/375

(58) Field of Classification Search ................ 220/303, 220/DIG. 33, 304, DIG. 32, 375, 203.24; 252/500, 519.33; 428/463, 461, 520
See application file for complete search history.

(56) References Cited

U.S. PATENT DOCUMENTS

| | | |
|---|---|---|
| 2,844,275 A | 7/1958 | Keller |
| 3,280,372 A | 10/1966 | DePew |
| 3,289,876 A | 12/1966 | DePew |
| 3,343,707 A | 9/1967 | DePew et al. |
| 3,391,817 A | 7/1968 | Shaw |
| 3,476,285 A | 11/1969 | DePew |
| 3,557,993 A | 1/1971 | DePew |
| 4,177,931 A | 12/1979 | Evans |
| 4,189,059 A | 2/1980 | Shaw |
| 4,319,303 A | 3/1982 | Thorn |
| 4,575,432 A | 3/1986 | Lin et al. |
| 4,597,504 A | 7/1986 | Witt |

(Continued)

FOREIGN PATENT DOCUMENTS

EP    0 748 712 A1    12/1996

(Continued)

OTHER PUBLICATIONS

Seyhan Ege, Organic Chemistry, third edition copyright @ 1994, pp. 4, 5, 1283, 1284 and 1291.*

(Continued)

*Primary Examiner*—Lien M. Ngo
(74) *Attorney, Agent, or Firm*—Barnes & Thornburg LLP

(57) ABSTRACT

A fuel cap is provided for use in a filler neck of a tank of a vehicle having body portions which are conductive. The fuel cap includes a housing sized to fit into the filler neck and a cover coupled to an upper end of the housing. The cover is made of a non-conductive resin and an electrically conductive coating covering at least a portion of the non-conductive resin. The coating has a thickness of between approximately 0.1 and 0.6 mil. The fuel cap further includes a conductive discharge member having a first end engaged with the electrically conductive coating of the cover and a second end adapted to be coupled to one of the filler neck and the body of the vehicle to dissipate static charge.

5 Claims, 7 Drawing Sheets

U.S. PATENT DOCUMENTS

| | | | |
|---|---|---|---|
| 4,655,964 A | 4/1987 | Steinberger et al. |
| 4,660,056 A | 4/1987 | Yokoi |
| 4,676,390 A | 6/1987 | Harris |
| 4,678,097 A | 7/1987 | Crute |
| 4,686,108 A | 8/1987 | Nason et al. |
| 4,730,652 A | 3/1988 | Bartholomew |
| 4,765,505 A | 8/1988 | Harris |
| 4,854,471 A | 8/1989 | Kasugai et al. |
| 4,957,504 A | 9/1990 | Chardack |
| 4,974,307 A | 12/1990 | Uebayashi et al. |
| 4,993,578 A | 2/1991 | Kerby |
| 5,056,570 A | 10/1991 | Harris et al. |
| 5,167,340 A | 12/1992 | Shaw |
| 5,203,466 A | 4/1993 | Kasugai et al. |
| 5,378,403 A | 1/1995 | Shacklette |
| 5,395,004 A | 3/1995 | Griffin et al. |
| 5,449,086 A | 9/1995 | Harris |
| 5,480,055 A | 1/1996 | Harris et al. |
| 5,520,300 A | 5/1996 | Griffin |
| 5,540,347 A | 7/1996 | Griffin |
| 5,615,793 A | 4/1997 | Muller |
| 5,647,330 A | 7/1997 | Sawert et al. |
| 5,758,627 A | 6/1998 | Minagawa et al. |
| 5,794,806 A | 8/1998 | Harris et al. |
| 5,798,060 A | 8/1998 | Brevett |
| 5,975,328 A | 11/1999 | Hagano et al. |
| 5,992,669 A | 11/1999 | Hagano et al. |
| 5,992,670 A | 11/1999 | Hagano et al. |
| 5,992,672 A | 11/1999 | Hagano et al. |
| 5,996,829 A | 12/1999 | Hagano et al. |
| 5,996,830 A | 12/1999 | Hagano et al. |
| 6,003,709 A | 12/1999 | Hagano et al. |
| 6,004,462 A | 12/1999 | Yamada et al. |
| 6,079,584 A | 6/2000 | Griffin |
| 6,164,482 A | 12/2000 | Araki et al. |
| 6,168,713 B1 | 1/2001 | Sekine et al. |
| 6,180,211 B1 | 1/2001 | Held |
| 6,180,221 B1 | 1/2001 | Crotzer et al. |
| 6,197,858 B1 | 3/2001 | Hagano et al. |
| 6,270,905 B1 * | 8/2001 | Swarup et al. ............... 428/463 |
| 6,273,286 B1 | 8/2001 | Segrest, III |
| 6,308,852 B1 | 10/2001 | Hagano et al. |
| 6,508,374 B1 | 1/2003 | Griffin et al. |
| 6,583,187 B1 * | 6/2003 | Daly et al. .................... 521/56 |
| 6,616,016 B1 * | 9/2003 | Hicks et al. ................. 222/212 |
| 6,623,793 B1 * | 9/2003 | Mushett et al. .......... 427/163.4 |
| 2003/0116524 A1 * | 6/2003 | Robinson et al. |
| 2003/0173362 A1 * | 9/2003 | Ishida et al. |

FOREIGN PATENT DOCUMENTS

| | | |
|---|---|---|
| EP | 0 827 914 A2 | 3/1998 |
| EP | 0 869 024 A2 | 10/1998 |
| EP | 0 869 025 A2 | 10/1998 |
| EP | 1 068 948 | 1/2001 |
| EP | 0 926 199 | 8/2002 |
| JP | 2001-058369 | 3/2001 |
| JP | 2002205751 | 7/2002 |
| WO | WO99/05026 | 2/1999 |

OTHER PUBLICATIONS

U.S. Department of Defense Military Specification: Cap, Fluid Tank Filler; MIL-C-38373B, Jul. 1, 1975; pp. 1-25.

U.S. Department of Defense Military Specification: Cap, Fluid Tank Filler; MIL-C-38373B, Amendment 2; Oct. 21, 1985; pp. 1-6.

* cited by examiner

STATIC CHARGE DISSIPATER FOR FILLER NECK CLOSURE

CROSS-REFERENCE TO RELATED APPLICATIONS

This application claims priority under 35 U.S.C. § 119(e) to U.S. Provisional Patent Application Ser. No. 60/376,770 filed May 1, 2002, the disclosure of which is hereby incorporated by reference herein.

BACKGROUND

The present disclosure relates to a fuel cap, and particularly to a fuel cap for closing a vehicle fuel tank filler neck. Specifically, the present disclosure relates to an electrically conductive fuel cap which dissipates static charge.

Fuel caps and fuel components of various types have been made conductive to dissipate static charges. It is known, for example, to mold plastic components with conductive carbon black particles mixed into resin from which the component is molded. It has also been suggested that a conductive coating may be applied to a fuel cap component, for example, by coating the component with an epoxy resin containing conductive particles. See for example U.S. Pat. No. 6,003,709, col. 3, lines 2–20.

Further, the following U.S. and foreign patents establish the nature of fuel caps for closing a vehicle fuel tank filler neck: U.S. Pat. Nos. 6,003,709; 6,197,858; 5,992,670; 5,975,328; 5,992,672; 5,996,829; 5,996,830; 4,319,303; and 6,164,482; European Patent Document 0827914 B1; and Japanese Patent Document P3200732. All of such references are hereby incorporated herein by reference for purposes of disclosing the nature of such fuel caps.

While making a fuel cap component conductive by a coating process has been suggested, the prior art has not yet produced a coating process which is suitable for quantity production at a reasonable cost or which is suitable for use in a fuel cap environment. Such a coating must be relatively thin and attractive, low cost, resistant to wear and resistant to the fuel environment.

SUMMARY

The present invention comprises one or more of the following features or combinations thereof.

A fuel cap is provided with a cover molded from a plastic resin, typically a nylon or acetal, to form an outer shell. This shell may be molded from a non-conductive resin and then coated at least in part with a conductive coating. For example, in some cases, only the outer gripping surface of the shell may be coated, and in other cases, all or substantially all of its surfaces may be coated. The coating should be sufficiently conductive to discharge a static charge built up by the operator. Typically the conductive coating will be coupled to the conductive filler neck or a conductive portion of the vehicle body near or adjacent to the filler neck.

It has been found that a relatively thin coating comprising a thermosetting resin, a thermoplastic resin, and conductive particles will provide a suitable conductive surface having good wear characteristics and resistance to the fuel environment. One illustrative example, is an alkyd resin as the thermosetting resin, chlorinated polyoleffin as the thermoplastic resin, and carbon black particles as the conductive particles. In one illustrative embodiment, a coating normally supplied for use as a pre-coating or as an adhesion promoter has been found to have excellent characteristics as the primary or only coating for a fuel cap shell.

Features of the disclosure will become apparent to those skilled in the art upon consideration of the following detailed description of preferred embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION OF THE DRAWINGS

Figure 1:
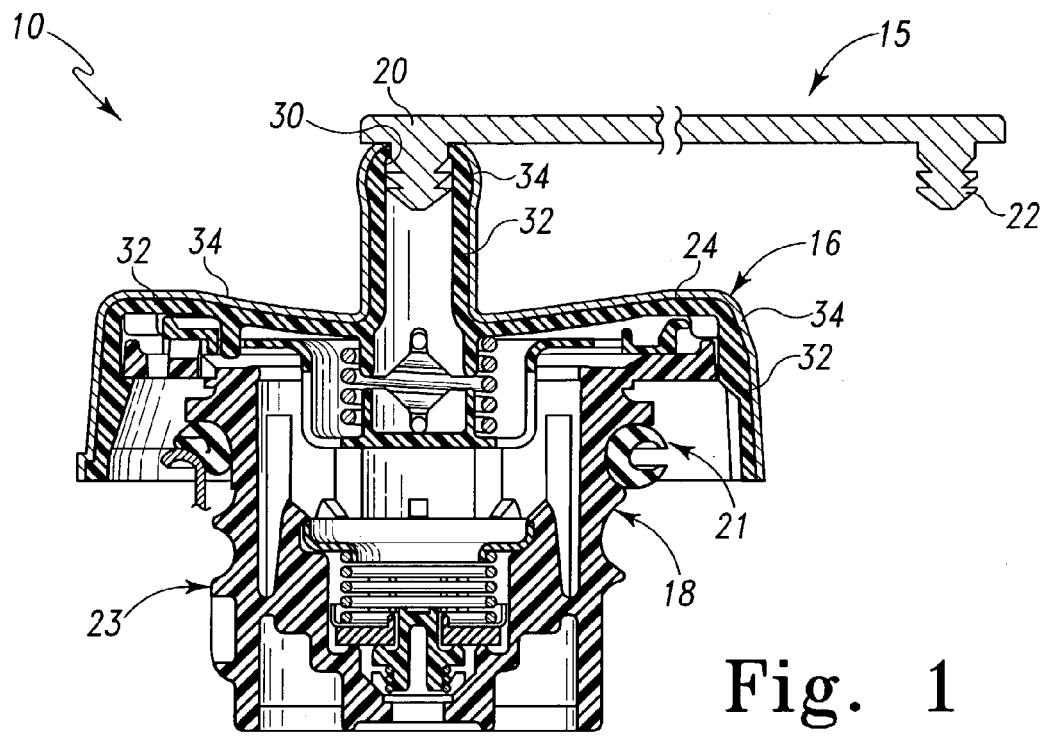
FIG. 1 is a sectional view of a fuel cap of the present disclosure showing the fuel cap including a handle or cover having a resin shell and an electrically conductive outer coating applied thereon, a housing coupled to the handle, and a plug tether, made of a conductive material, coupled to and positioned within the handle for contact with the conductive coating.
Figure 2:
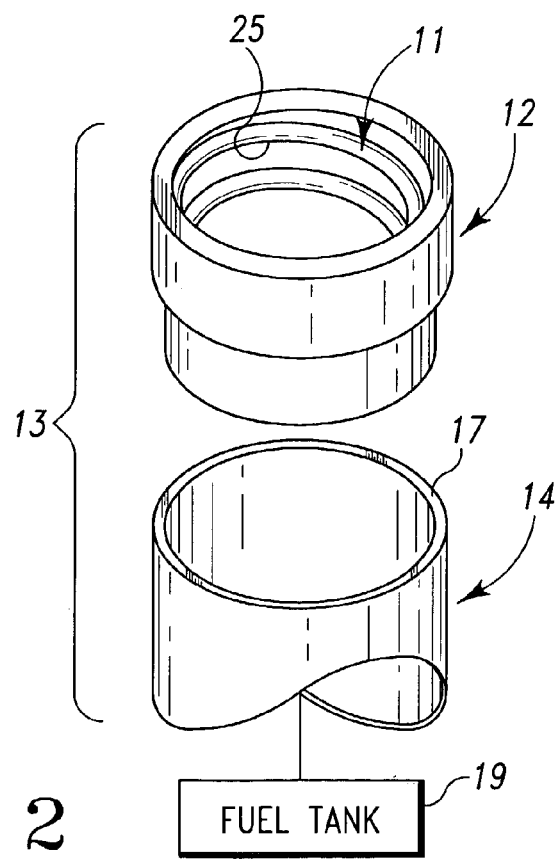
FIG. 2 is a perspective view of an illustrative fuel-receiving assembly for engagement with the fuel cap.

A fuel cap 10, shown in FIG. 1, is provided for use with an illustrative fuel-receiving assembly, such as assembly 13 shown in FIG. 2. A portion of the fuel cap 10 includes a handle or cover 16 including a non-conductive body portion or resin shell 32, such as nylon, for example, and an electrically conductive outer coating 34 deposited on the shell 32 to provide a means for static charge dissipation. The illustrative coating 34 is sufficiently conductive to dissipate a static charge built up by an operator, for example, as the operator grasps the cover 16 to remove the fuel cap 10 from the fuel-receiving assembly 13 prior to refueling.

The fuel-receiving assembly 13 includes a fuel tank filler neck 14 and a tank filler neck insert 12 on an open end 17 thereof. The fuel cap 10 is engageable with the fuel-receiving assembly 13 to close and seal an open mouth or fuel port 11 of tank filler neck insert 12. Tank filler neck insert 12 is made of an electrically conductive plastics material or any other electrically conductive material such as metal, for example. Fuel tank 19 is of known construction and as such is shown diagrammatically in FIG. 2. Electrically conductive portions of fuel-receiving assembly 13 are normally grounded through the vehicle (not shown). As mentioned above, portions of fuel cap 10 are also made of an electrically conductive material, specifically, an electrically conductive coating 34. When installed in the fuel-receiving assembly 13, the fuel cap 10 is electrically grounded through the vehicle by an electrically conductive discharge member 15 coupled at one end to fuel cap 10 to engage the conductive coating 34 and coupled at another end to a portion of the vehicle, as is discussed in greater detail below.

Occasionally, vehicle occupants or service station attendants will "carry" a static electricity charge having an electrical potential that is higher than the vehicle itself. A fuel cap in accordance with the present disclosure is configured to "ground" a person touching the fuel cap prior to removal of the fuel cap from the filler neck 14 so as to dissipate to ground, in a controlled manner, any electrostatic charge or potential on the person at the outset of a vehicle refueling cycle and before fuel vapor is allowed to vent through the mouth 11 of the filler neck 14.

Illustrative fuel caps are disclosed in PCT International Publication No. WO 99/05026 entitled "Fuel Cap" and in U.S. Pat. No. 6,508,374 entitled "Filler Neck Closure with Static Charge Dissipater", issued Jan. 21, 2003, the disclosures of each of which are hereby incorporated by reference herein.

As mentioned above, fuel cap 10 includes a cover 16 and a housing or fuel port closure 18 coupled at a first end to and positioned under cover 16. Fuel port closure 18 is a quick-on type closure and is normally received within filler neck insert 12 of assembly 13. Fuel cap 10 further includes a tether 15 coupled to and received within handle 16. Tether 15 acts as the discharge member of fuel cap 10 to provide an electrically conductive path between the fuel cap 10 and a grounded portion of the vehicle through which any static charge may dissipate.

Illustrative tether 15 is a plug tether including a first end 20 received within an aperture 30 of cover 16 and a second end 22. Second end 22 of tether 15 may be coupled to either a body portion (not shown) of the vehicle or to a portion of fuel-receiving assembly 13. The body portion (not shown) of the vehicle to which the second end 22 of tether 15 may be coupled is an electrically conductive body portion, such as an assembly closure door (not shown), for example. Tether 15 also acts to couple fuel cap 10 to the vehicle (not shown) to prevent a user, for example, from misplacing fuel cap 10 during a fuel tank refueling period.

Tether 15 is molded from an electrically conductive material. Illustrative tether 15 is made of a thermoplastic elastomer having conductive particles provided throughout. Such conductive particles may be carbon black particles, stainless steel powder or fibers, and/or Perma-Stat® particles. Stainless steel powder or fiber particles are available through RTP, Co. of Wynona, Minn. (hereinafter "RTP") and Ticona of Summit, N.J., for example. The Perma-Stat® particles are also available through RTP. Although illustrative tether 15 is made of a thermoplastic elastomer having conductive particles, tether 15 may also be made of other plastics such as nylon having conductive particles provided therein, for example. Further, tether 15 may be made of metal and may be a metal chain, for example. In other words, tether 15 may be made of various materials such that tether 15 is electrically conductive.

As mentioned above, first end 20 of tether 15 is coupled to cover 16. Second end 22 of tether 15 is coupled to an electrically conductive portion of the vehicle (not shown). Therefore, tether 15 is a discharge member for dissipating static charge from an operator grabbing handle 16 of fuel cap 10 to the conductive body of the vehicle in order to prevent any electrostatic charge or potential on the operator from igniting fuel vapor vented through the mouth 11 of the filler neck 14. Tether 15 provides a conductive path between illustrative electrically conductive fuel cap 10 and the vehicle to fully ground the fuel cap 10 and operator grasping the fuel cap 10 prior to breaking a sealed connection at O-ring seal 21 between closure member 18 and filler neck insert 12 during removal of cap 10 from filler neck 14 prior to refueling the fuel tank 19. Any static charge carried by the operator, therefore, is discharged before any fuel vapors escape from within assembly 13 to potentially be ignited by such a static charge.

Shell 32 of handle 16 is made of an electrically non-conductive resin or plastics material. Illustrative non-conductive plastics material 32 is a nylon resin such as Nylon 66 made by E.I. DuPont de Nemours & Co. (hereinafter "DuPont"), of Wilmington, Del. or Nylon 6 made by RTP. As is discussed in greater detail below, nylon resin is injection molded to form the resin shell 32 of handle 16. Although the resin shell 32 of cover 16 is molded from a nylon resin, it is within the scope of this disclosure to mold the resin shell 32 cover 16 from any type of polyamide resin or another material such as acetal, for example.

Cover 16 further includes electrically conductive outer coating 34 applied to an outer surface 24 of the nylon resin shell 32. Illustrative conductive coating 34 is approximately 0.2–0.4 mil thick and includes a thermosetting resin, a thermoplastic resin, and conductive particles. Specifically, coating 34 includes a particulate conductor dispersed in a solid polymer matrix comprising a covalently cross-linked thermoset polymer and a non-covalently cross-linked thermoplastic polymer. Typically, the particulate conductor will be a micro-particulate conductor. In some cases, the conductive coating 34 may range from about 0.1 mil to 0.6 mil thick. It is within the scope of this disclosure, however, to include cover 16 having an electrically conductive coating, such as coating 34, with any suitable thickness so as to maintain sufficient durability and wearability standards as well as ensure a suitable dissipation rate of a typical static charge carried by an operator, for example.

As is discussed in greater detail below, coating 34 is formed by applying a coating composition (not shown) comprising the thermosetting resin, the thermoplastic resin, and the conductive particles in a solvent solution. This coating composition is atomized and then sprayed onto outer surface 24 of resin shell 32. However, it is within the scope of this disclosure to apply the coating using other suitable means such as through the use of an electrostatic sprayer or via vacuum deposition, for example.

Once applied to the resin shell 32, solvents of the coating composition are driven off to leave the conductive coating 34 coupled to resin shell 32. Illustratively, the thermosetting resin is an alkyd resin, the thermoplastic resin is a chlorinated polyoleffin, and the conductive particles are carbon black particles. The carbon black particles typically make up approximately 1% to 10% of the conductive coating 34. Although the illustrative conductive particles of the coating are carbon black particles, it is within the scope of this disclosure for the conductive particles to be any other suitable conductive particles such as, for example, stainless steel powder or fiber particles and/or Perma-Static®, for example.

Illustrative conductive coating 34 coupled to shell 32 is product number 764-2592 Adhesion Promoter made by DuPont. This product (764-2592) is a high solids conductive adhesion promoter designed to promote adhesion between olefin plastics and primers or high solids basecoat/clearcoat systems. In other words, Dupont's adhesion promoter is used as a basecoat for various olefinic plastic objects prior to applying another coating, such as paint, for example, to the object. The electrically conductive adhesion promoter or coating 34, therefore, is used as a pre-coat and allows a final coat of paint to be electrostatically sprayed onto a plastic object. Additional information relating to the coating of the present disclosure and properties thereof are contained in the attached material data sheets found in Appendix A.

Coating 34 is generally black or gray in color typically because of the carbon black particles present therein. Nylon resin shell 32 is generally black or gray in color as well. Therefore, application of coating 34 to resin shell 32 does not appreciably change the appearance of shell 32. As shown in FIG. 1, coating 34 is applied to outer surface 24 of resin shell 32.

Housing 18 of fuel cap 10 is made of a non-conductive material such as acetal, for example. Housing 18 (including a threaded portion 23) is insertable into filler neck insert 12 to retain cap 10 in a closed position to cover fuel port 11. Housing 18 is sized and dimensioned to engage at least a portion of an internal surface 25 of the insert 12 of fuel-receiving assembly 13.

To prevent a potential electrical discharge (spark) during fuel cap 10 removal, a means is provided for dissipating an electrical charge from an operator attempting to refuel the vehicle (not shown), who is at a first electrical potential, and the vehicle, specifically the metal fuel filler neck 14, which is at a second electrical potential, to reach a common level immediately prior to opening the cap 10 and releasing fuel vapor from fuel tank 19. Such means for dissipating an electrical charge through cap 10 includes the conductive coating 34 coated onto the nylon resin shell 32 of cover 16 and the conductive tether 15 coupled to cover 16 and engaged with conductive coating 34 of cover 16. These components define a common electrically conductive path facilitating and establishing a common electrical potential. As mentioned above, conductive tether 15 is coupled at first end 20 to cover 16 and may be coupled at second end 22 to either an electrically conductive body portion (not shown) of the vehicle (not shown) or to filler neck insert 12 of fuel-receiving assembly 13, which, as mentioned above, is grounded through the vehicle. Thus, tether 15 acts as a discharge member to dissipate a static charge carried by the operator, for example, from the fuel cap 10 to ground.

Figure 3:
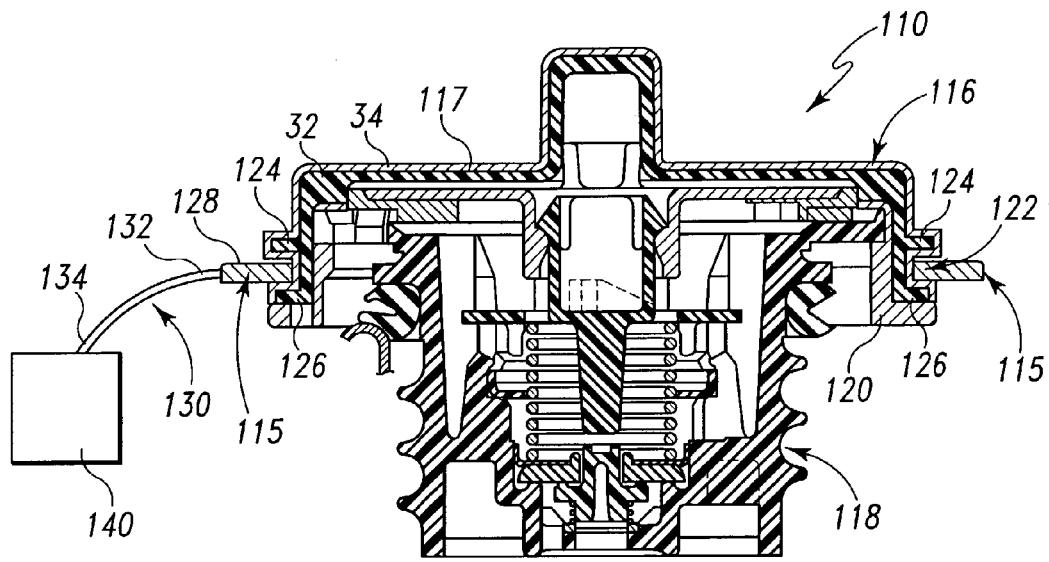
FIG. 3 is a sectional view of another fuel cap in accordance with the present disclosure showing the fuel cap including a cover having a resin shell and the electrically conductive outer coating applied thereon, a housing coupled to the cover, and a ring tether made of a conductive material and forming an outer ring around the cover.

In another illustrative embodiment, shown in FIG. 3, another fuel cap 110 is provided for use with a fuel-receiving assembly, such as assembly 13, for example. Illustrative fuel cap 110 is similar to fuel cap 10 and includes a cover 116 having non-conductive, nylon resin body 32 and the conductive outer coating 34, discussed above and in Appendix A, coupled to the resin shell 32. Illustratively, conductive coating 34 is applied to an outer surface 117 of resin shell 32. Fuel cap 110 also includes a threaded profile housing or fuel port closure 118 coupled at a first end to and positioned under the handle 116 as well as a retainer 120 arranged to couple or support cover 116 on housing 118. Retainer 120 may also permit lost motion between handle 116 and fuel port closure 118.

Fuel cap 110 also includes a ring tether 115 coupled to cover 116. Illustrative ring tether 115 is positioned within a notch 122 of cover 116 defined by first and second rims 124, 126 of cover 116. Tether 115 is also supported by the retainer 120. Tether 115 includes a generally ring-shaped portion 128 to fit around handle 116 and within notch 122 and a leash portion 130 (shown diagrammatically in FIG. 3) coupled to ring-shaped portion 128. Leash portion 130 is coupled at a first end 132 to ring-shaped portion 128 and is illustratively coupled at a second end 134 to a conductive body portion 140 (also shown diagrammatically in FIG. 3) of the vehicle (not shown). As mentioned above with respect to tether 15, tether 115 may also be coupled to filler neck 12 of assembly 13 in order to establish a grounded connection for cover 116.

Further, tether 115 may be made from the same materials as those discussed above with respect to tether 15. Tether 115 is conductive and, therefore, acts as a discharge member for fuel cap 10. Tether 115 is in contact with conductive coating 34 of cover 16. Therefore, any static charge carried on an operator is dissipated through the conductive coating 34 of the handle (grasped by the user) and along the discharge member or tether 115 to either a conductive portion 140 of the vehicle or to the filler neck 12 of the assembly, both of which are normally grounded.

Figure 4:
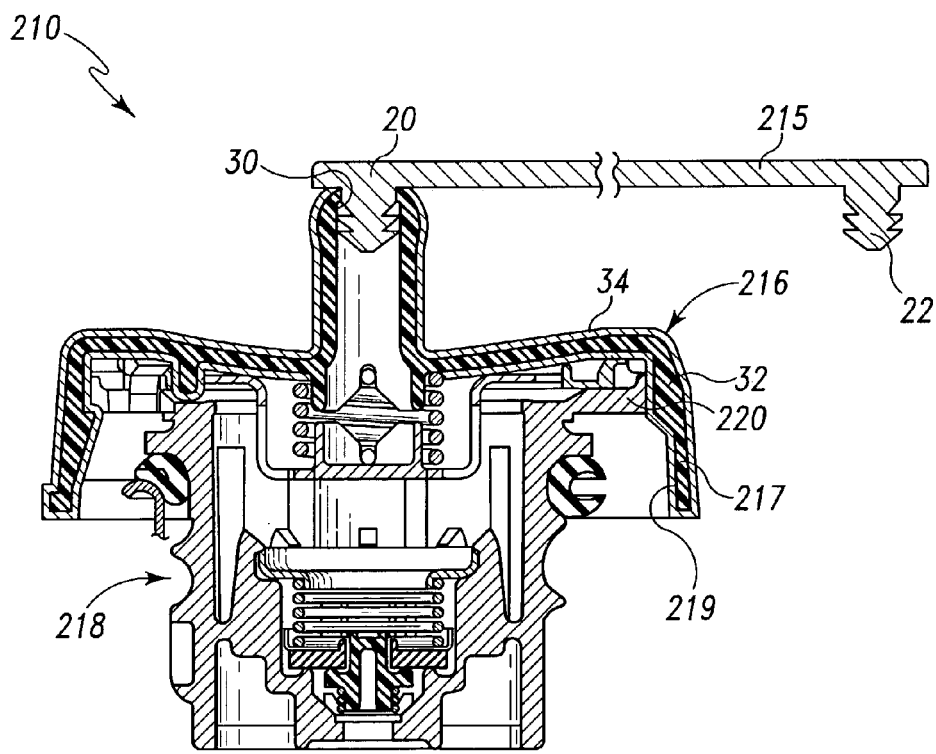
FIG. 4 is a sectional view of another fuel cap in accordance with the present disclosure showing the fuel cap including a cover having a resin shell and an electrically conductive coating deposited on both an outer surface and an inner surface of the resin shell, a housing made of a conductive material coupled to the cover, and a plug tether coupled to the cover.

In yet another illustrative embodiment, shown in FIG. 4, another fuel cap 210 is provided. Fuel cap 210 is similar to fuel caps 10, 110 and includes a cover 216 having non-conductive resin shell 32 and conductive coating 34 coupled to both an outer surface 217 and an inner surface 219 of body 32. Fuel cap 210 further includes a housing 218 coupled at a first end to handle 216. Coating 34 coupled to inner surface 219 of resin shell 32 is engaged with an upper portion 220 of housing 218.

Unlike housings 18, 118 of respective fuel caps 10, 110, illustrative housing 218 of fuel cap 210 is made of an electrically conductive material. For example, housing 218 is illustratively made from a combination of acetal and conductive particles. The conductive particles may be stainless steel powders or fibers, carbon black particles, and/or Perma-Stat®, for example. As mentioned above, acetal made with stainless steel powder or fibers is supplied by Ticona and RTP. Acetal made with carbon fibers is supplied by Ticona and DuPont, and acetal made with Perma-Stat® is supplied by RTP, as well. It is also within the scope of this disclosure for housing 218 to be made of a non-conductive resin having an electrically conductive coating, such as coating 34, deposited thereon. Because housing 218 is electrically conductive, a discharge path is established from the coating 34 coupled to outer surface 217 of the resin body 32 of the cover 216, to coating 34 coupled to the inner surface 219 of the resin body 32 of the cover 216, to the electrically conductive housing 218 of the cap 210, and finally to the assembly 13 which is grounded through the vehicle. Thus, a tether 215 of fuel cap 210 is not necessary as a discharge member and, therefore, may or may not be made of an electrically conductive material.

Figure 5:
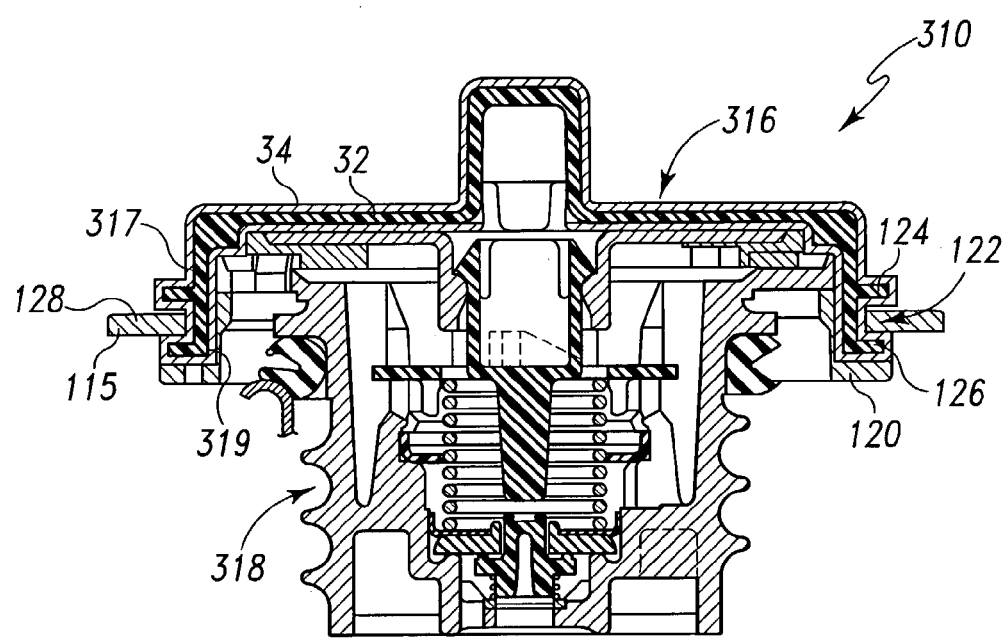
FIG. 5 is a sectional view of yet another fuel cap in accordance with the present disclosure showing the fuel cap including a cover having a resin shell and the electrically conductive coating deposited on the outer and inner surfaces of the shell, a housing made of a conductive material coupled to the cover, and a ring tether made of a conductive material coupled to the cover.

In yet another illustrative embodiment, shown in FIG. 5, another fuel cap 310 is provided. Fuel cap 310 includes a handle 316 comprising a body molded from the electrically non-conductive nylon resin 32 and the electrically conductive coating 34 of the present invention deposited thereon. Further, a housing 318 of the fuel cap 310 also includes a body molded from an electrically conductive material similar to housing 218 of FIG. 4.

The coating 34 is deposited onto both an outer surface 317 and an inner surface 319 of the resin body 32 of the cover 316 so that an electrically conductive discharge path is established from an operator grasping cover 316 to the coating 34 deposited on outer surface 317, to the coating deposited on the inner surface 319, and finally to the electrically conductive housing 318. It is also within the scope of this disclosure to include a housing 318 made of an electrically non-conductive material having an electrically conductive coating deposited thereon, as discussed above.

Figure 6:
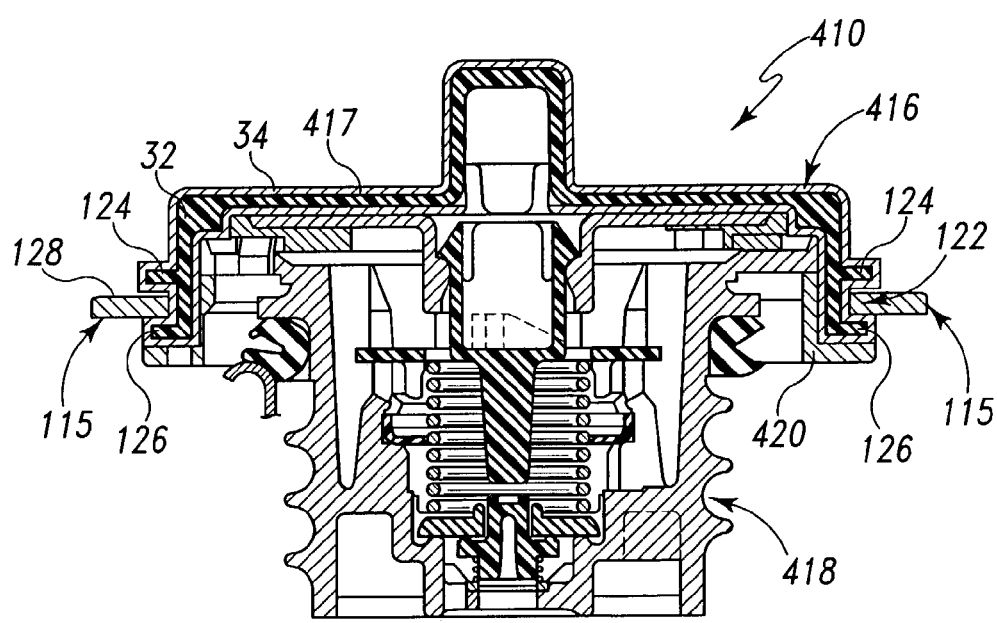
FIG. 6 is a sectional view of still another fuel cap in accordance with the present disclosure showing the fuel cap including a cover having a resin shell and the electrically conductive coating deposited on the outer surface of the shell, a housing made of a conductive material coupled to the cover, and a retainer ring made of a conductive material and engaged with both the conductive coating on the outer surface of the shell and the housing.

Yet another fuel cap 410 is provided in FIG. 6. Fuel cap 410 is similar to fuel cap 310 of FIG. 5 and fuel cap 210 of FIG. 4 in that a housing 418 of fuel cap 410 is electrically conductive. However, the coating 34 of the fuel cap 410 is deposited only on the outer surface 417 of the resin body 32 of the cover 416 of the fuel cap 410. A retainer 420 of the fuel cap 410 is further provided and is molded from an electrically conductive material. Retainer 420 is engaged with cover 416 and is specifically engaged with coating 34 coupled to the outer surface 417 of cover 416. Therefore, an electrically conductive discharge path is established from the operator grasping handle 416 to the coating 34 deposited on outer surface 417 of the resin body 32 of the handle 416, through the conductive retainer 420 engaged with the coating 34 on outer surface 417, and to the housing 418. From housing 418, the charge is dissipated to fuel receiving assembly 13 which is grounded through the vehicle.

Figure 7:
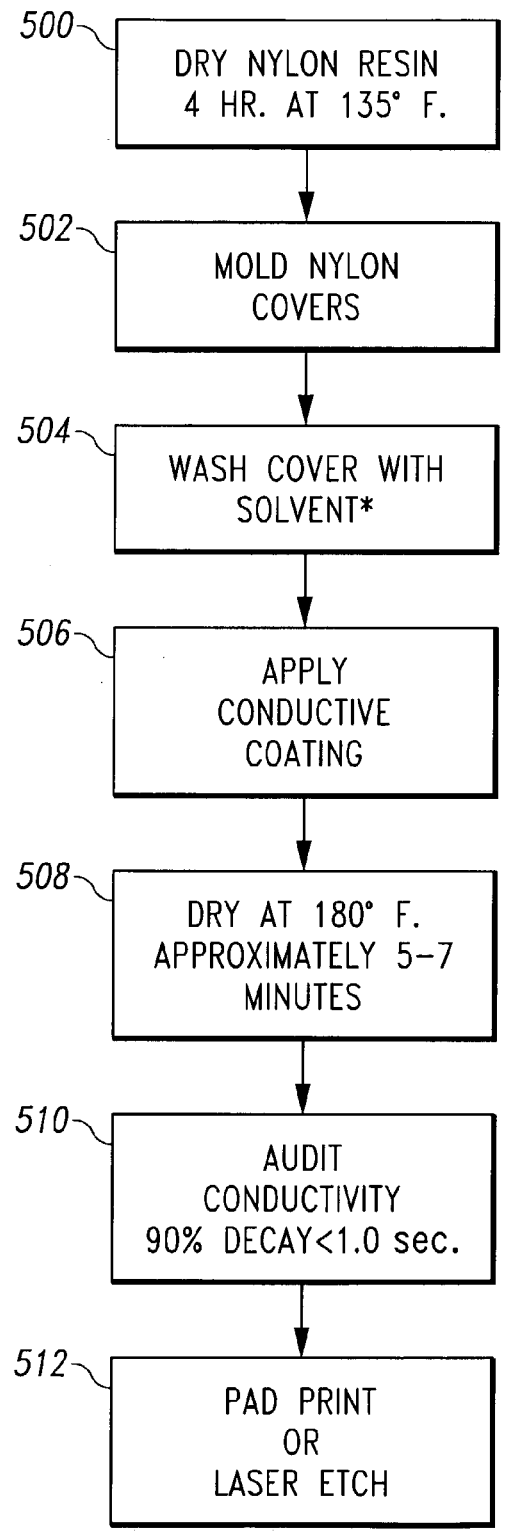
FIG. 7 is a flow chart illustrating a conductive coating process for coating a fuel cap in accordance with the present disclosure.

A method of forming covers 16, 116, 216, 316, 416 by coating resin bodies 32 of respective fuel caps 10, 110, 210, 310 or portions thereof with the electrically conductive coating 34 described above is disclosed herein. A flow chart illustrating this method is provided in FIG. 7, for example. The method includes drying nylon resin for approximately four hours at approximately 135° F., as shown in step 500, and then molding the nylon resin into the desired cover shape in step 502, such as those shown, for example, in FIGS. 1, and 3–6. Optionally, the method includes washing the resin body with a solvent after the cover has been molded, as shown in step 504. It is within the scope of this disclosure, however, to coat the resin body or portions thereof without washing the resin body with a solvent. The method includes in step 506 the step of applying the conductive solvent composition to leave conductive coating 34 to the molded resin body 32, or other appropriate portions of the fuel cap 10, 110, 210, 310, 410.

As discussed above, depending on the particular resin body being coated as well as the particular housing to which the coated cover is to be coupled, conductive coating 34 may be applied to the outer surface only of the cover or to both the outer and inner surfaces of the cover. Further, as mentioned above, the shell 32 of covers 16, 116, 216, 316, 416 or other portions of the respective fuel caps 10, 110, 210, 310, 410 are coated by using a spray gun to atomize the conductive coating composition. However, it is within the scope of this disclosure to include other techniques for applying a coating composition such as through electrostatic spraying, vacuum deposition, or other suitable application means.

The method next includes, in step 508, drying the coating composition on the nylon resin 32 of the cover 16, 116, 216, 316, 416 at approximately 180° F. for approximately 5 to 7 minutes to drive off the solvents within the coating composition to leave the conductive coating 34 thereon. In the drying process of step 508, there may be some degree of cross-linking between both the alkyd resin of coating 34 and the chlorinated polyoleffin of the coating 34 with the nylon base material of resin shell 32. However, most of the drying is in the solvent solution. The bonding process is a polymerization with some degree of cross-linking to the surface to be coated. Both the thermosetting resin and the thermoplastic resin are necessary to the coating composition. The chlorinated polyoleffin is a thermoplastic material and the alkyd resin may act as a hybrid material, but is generally considered to be a thermosetting resin as described above. The alkyd resin may not be considered to be a true thermoset material and also may not be considered to be a true thermoplastic material because the alkyd resin has properties of both thermoset materials and thermoplastic materials. For this reason, the alkyd resin may thus partially crosslink with the nylon shell 32. Alkyds generally crosslink with each other when they set. The alkyd resin may thus crosslink with itself as well as with portions of nylon shell 32, for example.

As mentioned above, illustrative coating 34 is Adhesion Product number 764-2592 by DuPont and is generally used in the industry as a pre-coat to prime a plastic shell for electrostatic painting of the shell, for example. Although the coating 34 is illustratively shown to coat a nylon resin shell, it is within the scope of this disclosure to coat other suitable plastics with coating 34. The coating 34 is capable of bonding to a variety of different plastics with a different degree of adhesion. For example, coating 34 is capable of bonding to acetal, but will have different adhesion characteristics with respect to the acetal than with respect to the nylon. Companies other than DuPont, such as BASF of Germany and PPG Industries of Pittsburg, Pa., for example, have conductive pre-coat products similar to Adhesion Product number 764-2592 by DuPont. It is within the scope of this disclosure for conductive coating 34 to include such products.

Finally, the coated cover 16, 116, 216, 316, 416 is then audited or tested in step 510 to ensure a proper decay rate or dissipation of electrical charge. As is described in more detail below, the coated cover 16, 116, 216, 316 may then be pad printed or laser etched, in step 512, if requested by the customer, for example.

FIGS. 8–11 diagrammatically illustrate the laboratory test of step 510 conducted to determine the decay rate of the cover or other portions of the cap which have been coated with the electrically conductive material. Illustratively, a lab stand 600 is provided and an insulator 602 is coupled to the lab stand 600 to hold the fuel cap 10 and filler neck 14 thereon. The filler neck 14 is grounded, as is the case in a vehicle, along line 604. Further, fuel cap 10 is grounded by way of tether 15 illustratively coupled to filler neck 14. As shown herein, fuel cap 10 is mounted on stand 600; however, it is within the scope of this disclosure to test each fuel cap 10, 110, 210, 310, 410. A contact member 606 is illustratively positioned above fuel cap 10 to selectively engage fuel cap 10 and apply a static charge thereto. A high voltage supply 608 is provided to illustratively supply a 1 kV along path 610 to contact member 606. Further illustratively, a capacitor 612 is located along path 610 having a capacitance of 150 pF, which is substantially equivalent to the capacitance of the human body.

Figure 8:
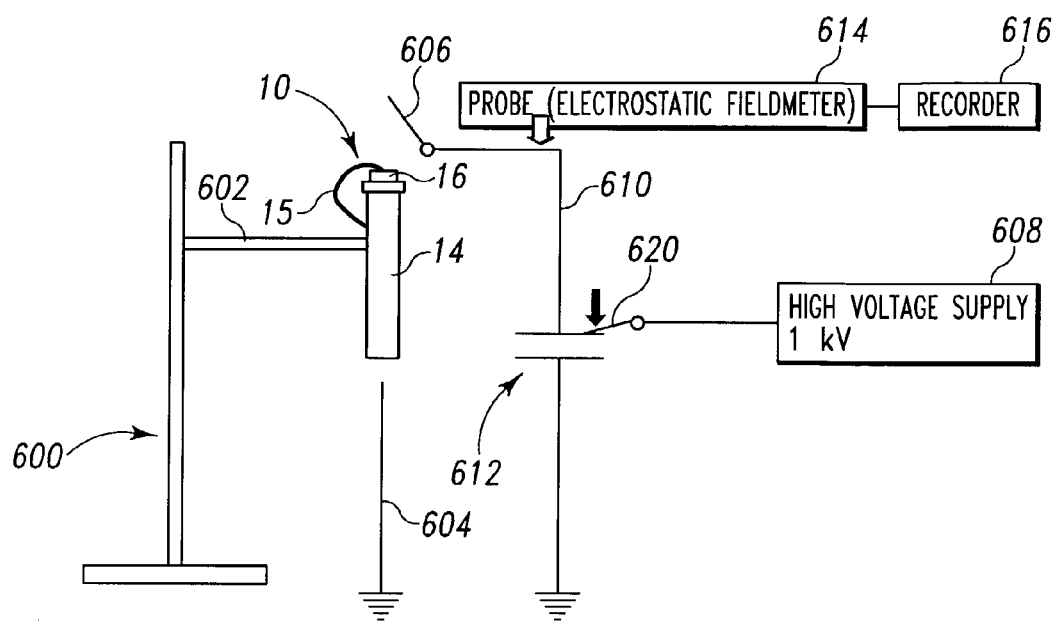
FIGS. 8–11 are diagrammatic views illustrating a laboratory test for applying a high voltage to a fuel cap having an electrically conductive outer coating to measure the decay rate or dissipation of the charge applied to the fuel cap.
Figure 9:
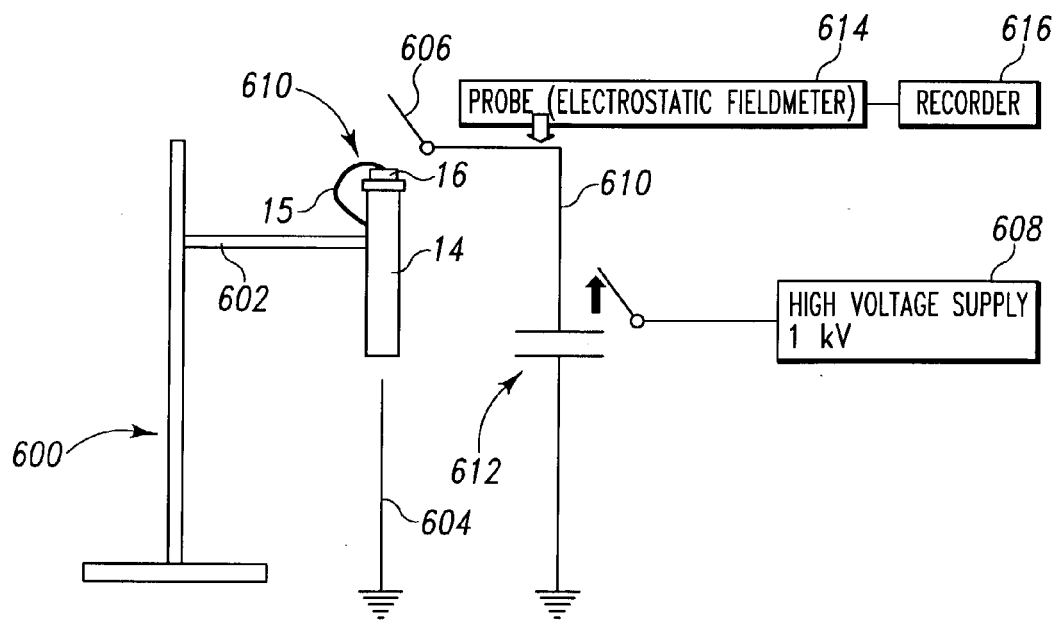
Figure 10:
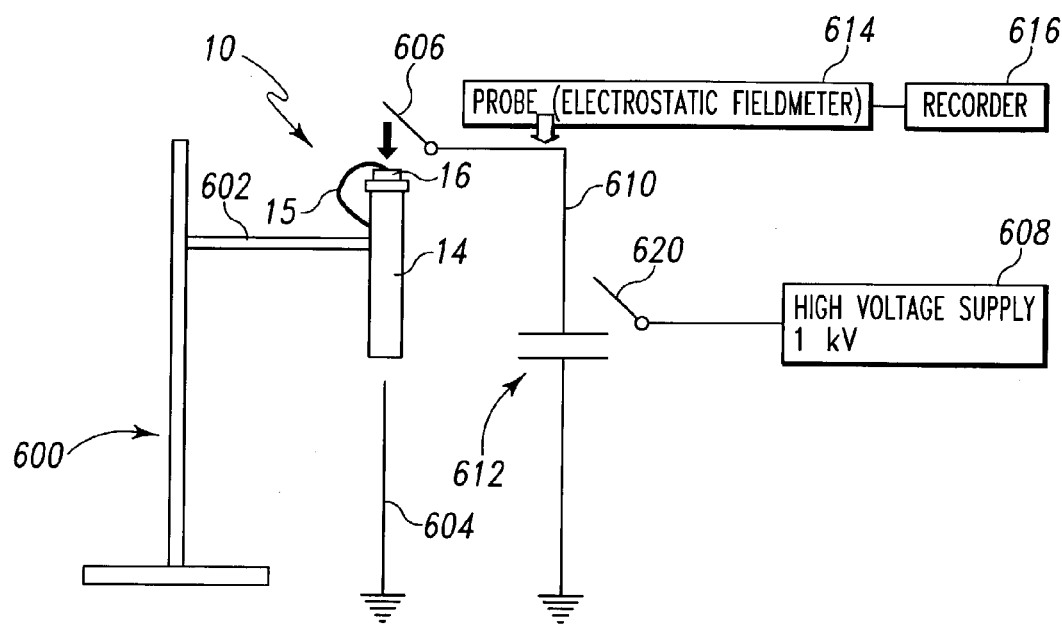
Figure 11:
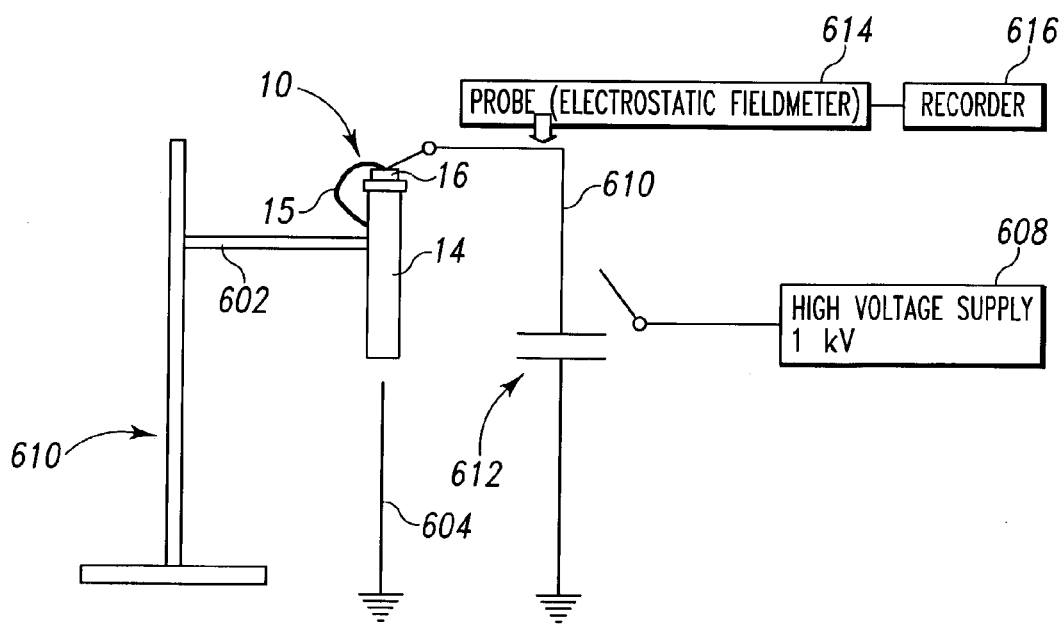
Figure 12:
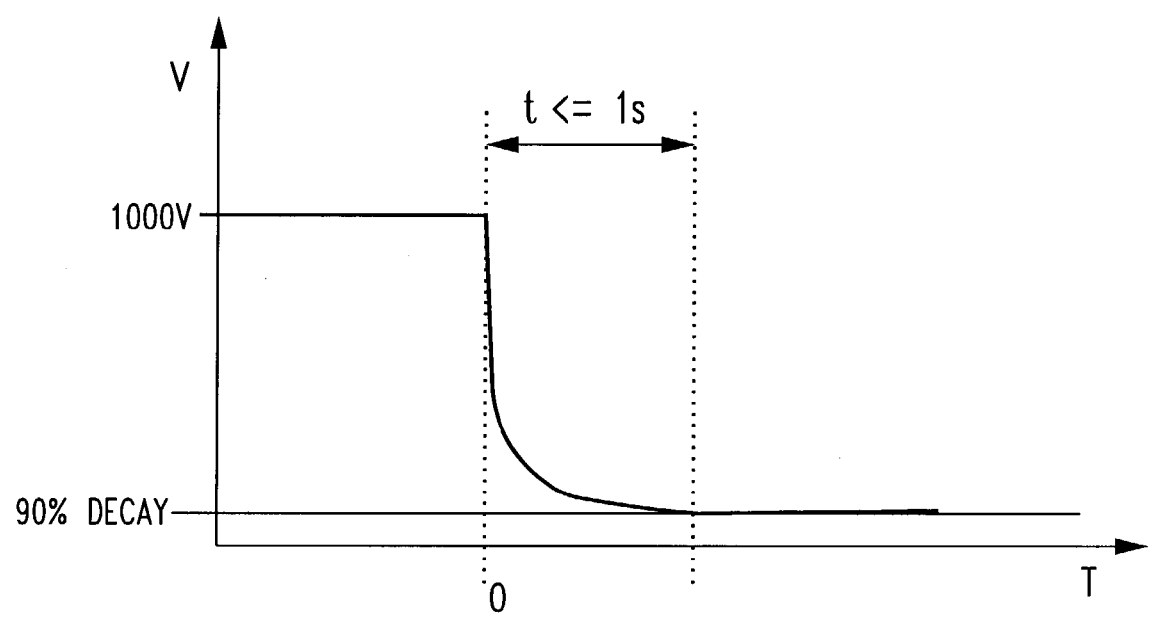
FIG. 12 is a graph showing the decay rate of an illustrative fuel cap in accordance with the present disclosure.

In testing, therefore, approximately 1 kV is applied to the cover 16 of fuel cap 10. Through the use if a probe, or electrostatic fieldmeter, 614 and a recorder 616 mounted along path 610 between contact member 606 and high voltage supply 608, the decay rate may be measured by determining the time required for the charge to dissipate out of the coated cover 16. The test is performed to ensure that 90% of the charge applied to each coated object dissipates within about 1.0 second, as shown, for example, in FIG. 12. In administering the test, as shown in FIG. 8, the high voltage supply 608 is coupled to capacitor 612 by a gate 620 to charge path 610 with the 1 kV charge. Contact member 606 remains in the open position spaced-apart from fuel cap 10. As shown in FIG. 9, the gate 620 is then moved to an open position to disengage the capacitor 612. Next, as shown in FIGS. 10 and 11, contact member 606 is moved to a closed position to contact fuel cap 10 and allow the 1 kV to discharge through the fuel cap 10 and filler neck 14 to ground. The probe 614 measures the change in voltage over time along path 610 when the circuit is closed by gate 620 engaging electrically conductive fuel cap cover 16.

As mentioned above with respect to step 512, for example, the coated cover 16, 116, 216, 316, 416 may be either pad printed or laser etched, as requested by the customer, for example. The laser etching technique uses a laser to burn through the conductive coating 34 to react with or excite the nylon resin 32 beneath. The portions of the nylon resin 32 excited by the laser turn generally white or off-white providing them distinguishable from the generally black coating 34 and black nylon resin 32. Thus, the laser etched details or lettering are easily readable by a customer and/or user.

Pad printing, or offset printing, is another technique used to identify or mark fuel caps for a customer, for example. In general, two part epoxy ink is mixed and placed onto a steel plate having had the design and/or lettering which is desired etched therein. Excess ink is scraped off the steel plate such that the only ink left is located within the etched design and/or lettering of the steel plate. A bulb is then placed over and pressed down upon the ink-filled design to pick up the ink epoxy. The bulb is then lifted from the steel plate and pressed down upon a particular fuel cap, such as fuel cap 10, 110, 210, 310, 410.

Oftentimes, it is desired to stamp or laser etch the design and/or lettering directly onto the cover 16, 116, 216, 316 of the fuel cap 10, 110, 210, 310 so that the lettering is readily visible to the customer or end user. Therefore, it is desirable for the conductive coating 34 (applied to the nylon resin body 32) to have properties such that a laser normally used in the industry is able to burn through the coating 34 to react with or excite the nylon or polyamide resin below. Further, it is desirable for the conductive coating 34 to have properties such that an epoxy ink such as that normally used in the industry, typically a two-part epoxy ink, is able to be printed onto and stick to the coating.

Illustrative conductive coating 34 has many other properties which make it conducive for use with a fuel cap and for use in such an environment. Conductive coating 34 should be durable, fuel resistant, weather resistant, and ozone resistant. Illustrative coating 34 is used as a top coat and has undergone the following fuel cap tests described below.

Ozone Test

Three illustrative fuel cap covers having conductive coating 34 applied thereon were exposed to a 20 day ozone test. The conductive coating 34 was tested to ensure that ozone exposure has no adverse effects on the coating 34. This test exposed each fuel cap to 50 pphm of ozone for 20 days at 30° C. The conductive coating 34 of each cap showed no signs of degradation after the ozone test had been performed. Therefore, the ozone had no apparent effect on the conductive coating of the covers tested.

Fuel Resistance Test

Three illustrative fuel cap covers having coating 34 applied thereon were immersed in fuel having 85% fuel C. Fuel C is an industry test fuel which includes 10% methanol and 5% ethanol. The covers were immersed and soaked in the fuel C for 400 hours. The covers were checked every 24 hours for signs of degradation. After 400 hours, no signs of degradation were present. Therefore, the fuel C had no apparent effect on the conductive coating of the covers tested.

Weatherability Test

Three fuel cap covers having conductive coating 34 applied thereon were exposed to bright, white light as well as temperature cycles to test for fading of the color of the conductive coating 34 thereon. Each fuel cap was exposed to 4 hours of the light at 60° C. and 4 hours of the light at 40° C. and 100% relative humidity. The total test time for each cap was 2,000 hours at the above cycles. No signs of color fade of the coating 34 were visible. Therefore, the bright, white light and temperature cycles had no apparent effect on the conductive coating of the covers tested.

Adhesion Test

One fuel cap cover having conductive coating 34 applied thereon was tested for adhesion. A pattern having 1 mm squares was etched into a portion of the conductive coating 34 on the fuel cap cover. A piece of tape was applied to the pattern. A 100% adhesion rate was achieved.

Multiple other fuel cap covers having conductive coating 34 applied thereon were tested with different weights and number of rubs to establish specifications. These cap covers were tested with 10 rubs at 175 g on RCA Abrader Test Equipment.

Wear Resistance Tests

Test 1:

To test the durability of the conductive coating 34 on the fuel cap cover the fuel cap cover was rotated to simulate fuel cap life durability. The cover was chucked in a lathe and the tether coupled to the cover was secured so as not to rotate with the cover. The cover was rotated 13,500 revolutions at 10 rpm (11 hours) to simulate the operating environment of approximate installations and removals. The resistance on the samples remained the same in the pre-test and the post-test. Also, the static decay test also remained the same with approximately 90% of the dissipation of the static charge being completed within 0.4 to 0.5 seconds. Upon visual inspection, the cover showed no visible wear or degradation from the 13,5000 revolutions.

Further, three fuel cap covers having coating 34 applied thereon were submitted to 15,000 rotational cycles where the body of the coated shell was rotated relative to the conductive tether. Specifically, the body of the coated shell was rotated in a lathe. After 15,000 revolutions at 20 rpm, there was no visible wear to the conductive coating 34. Physical damage and conductivity were tested. There were no apparent signs of degradation.

Test 2:

Three fuel cap covers having conductive coating 34 applied thereon were submitted to a ratchet cycle test. The fuel cap covers being tested had the conductive coating 34 applied to the inner surface of the body of the fuel cap including ratchet teeth 80 of the covers. The fuel cap covers were rotated to simulate the fuel cap covers being threaded into a filler neck of a fuel assembly as the ratchet teeth repeatedly engage portions of the filler neck. The covers were ratcheted 15,000 cycles. Each cycle includes three "clicks" of the ratchet teeth again the portion of the fuel cap. Every 5,000 ratchet cycles the covers were tested for conductivity and physical damage to coating. Each test showed no physical damage to the coating and no degradation of the coating to effect conductivity performance.

Temperature Resistance Test

Three covers were exposed to temperature cycles of −35° C. for three hours and 80° C. for three hours. 15,000 cycles were performed on each cover. The results showed no degradation of the conductive coating 34.

Acid Test

Three caps were exposed to an acid solution to simulate the effects of the acidity of an operator's hand repeatedly grasping the coating of the handle. The test procedure followed the B-method (or the drip method) specified in ISC-E00-006A. An amount of 0.2 to 0.5 cc of 2% $H_2SO_4$ at 20° C. was dripped onto the conductive coating of each fuel cap. The acid solution was kept in contact with the coating for 6 hours and then rinsed off. No degradation of the coating was observed.

Alkali Test

Three caps were exposed to a base solution to also simulate the effects of an operator's had repeatedly grasping the coating of the handle. The test procedure followed the B-method specified in ISC-E00-006A. An amount of 0.2 to 0.5 cc of 1% NaOH at 20° C. was dripped onto the conductive coating of each fuel cap. The alkaline solution was kept in contact with the coating for 6 hours and then rinsed off. No degradation of the coating was observed.

Although this invention has been described in detail with reference to certain embodiments, variations and modifications exist within the scope and spirit of the invention as described and defined in the following claims.

The invention claimed is:

1. A fuel cap for use in a filler neck of a tank of a vehicle having body portions which are conductive, the fuel cap comprising:

a housing sized to fit into the filler neck, a cover coupled to an upper end of the housing, the cover being made of a non-conductive resin and an electrically conductive coating covering at least a portion of the non-conductive resin, the coating including a particulate conductor dispersed in a solid polymer matrix comprising a covalently cross-linked thermoset polymer and a non-covalently cross-linked thermoplastic polymer, the coating having a thickness of between approximately 0.1 and 0.6 mil, and a conductive discharge member having a first end engaged with the electrically conductive coating of the cover and a second end adapted to be coupled to one of the filler neck and the body of the vehicle to dissipate static charge, and wherein the coating is effective to dissipate a static charge within approximately one second.

2. The fuel cap of claim 1, wherein the discharge member is made of a non-conductive resin and the electrically conductive coating coupled to the non-conductive resin.

3. The fuel cap of claim 1, wherein the discharge member is made of a conductive resin including a thermoplastic elastomer having conductive particles provided throughout.

4. The fuel cap of claim 1, wherein the conductive coating is coupled to an outer surface of the non-conductive resin and the discharge member includes a first end having a plug received within an aperture of the cover to engage a portion of the conductive coating and a second end adapted to be coupled to one of the filler neck and body of the vehicle.

5. A fuel cap for closing a vehicle fuel filler neck in which one of the fuel filler neck and the vehicle body surrounding the neck is conductive, the fuel cap comprising:

an cover to serve as a grip for hand engagement and removal of the cap, the cover being molded of resin to have an outer surface to face away from the filler neck, an inner surface to face toward the filler neck and a side wall to extend peripherally and axially inwardly relative to the filler neck, a conductive layer coating at least a portion of the outer surface of the cover to be a contact to be gripped by hand, and a discharge member to connect the conductive layer to one of the filler neck and the vehicle body surrounding the filler neck, the conductive layer comprising a coating comprising a particulate conductor dispersed in a solid polymer matrix comprising a covalently cross-linked thermoset polymer and a non-covalently cross-linked thermoplastic polymer and having a thickness of approximately 0.1 mil–0.6 mil, and wherein the coating is effective to dissipate a static charge within approximately one second.

* * * * *